Aug. 22, 1939.　　　D. W. KARNES　　　2,170,200
HEAD GATE CONTROL DEVICE
Filed Sept. 6, 1938　　6 Sheets-Sheet 2
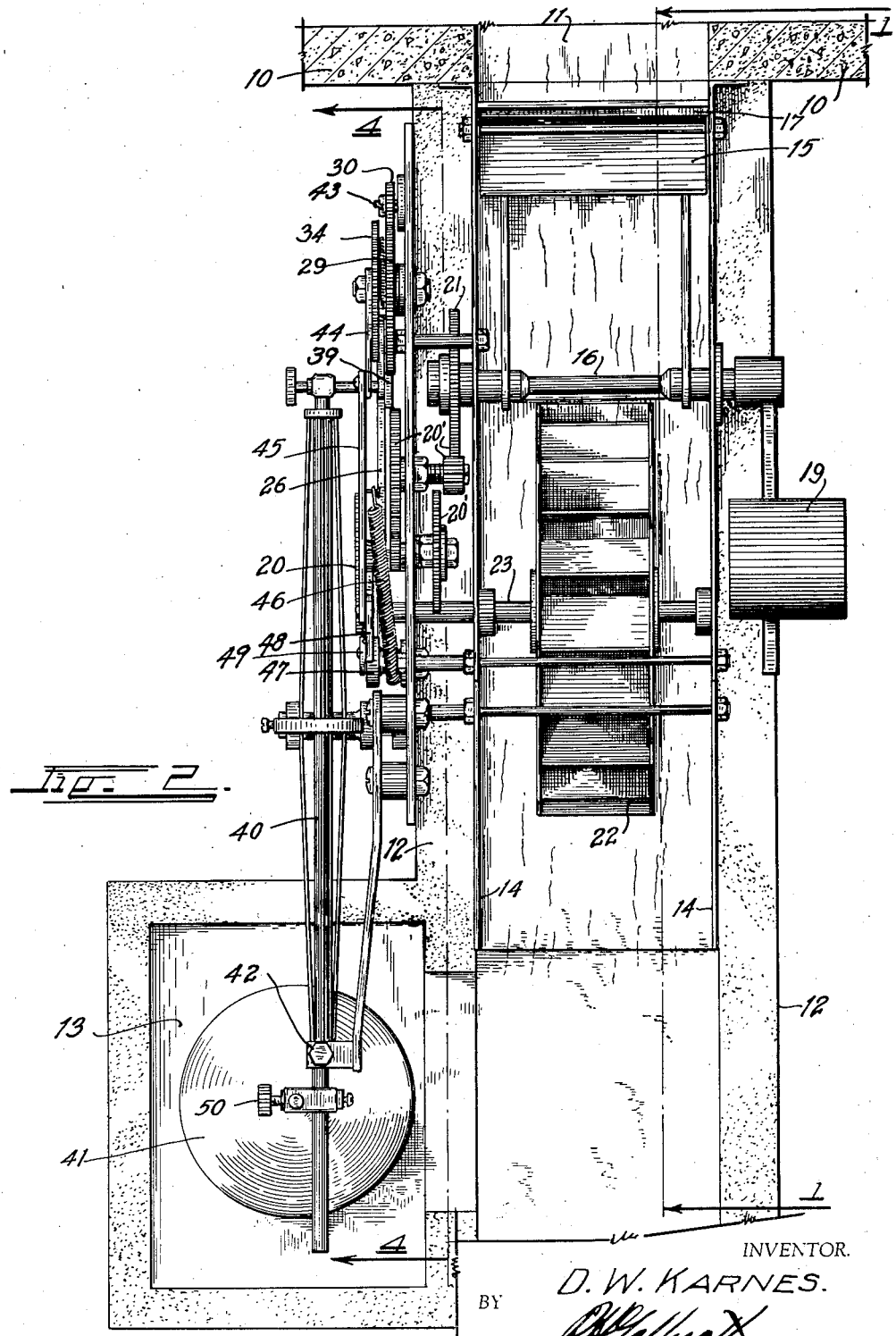
INVENTOR.
D. W. KARNES.
BY
ATTORNEY.

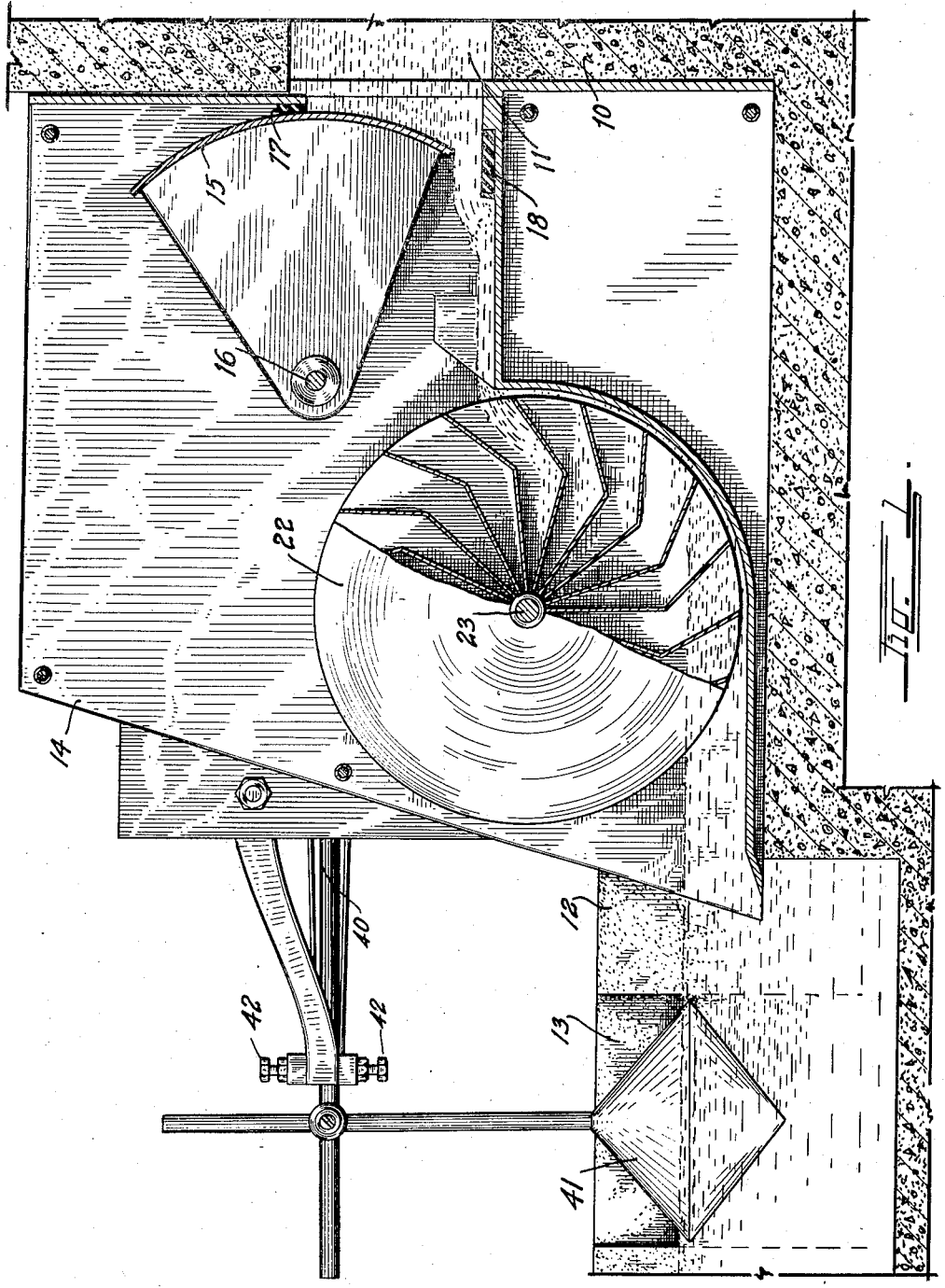

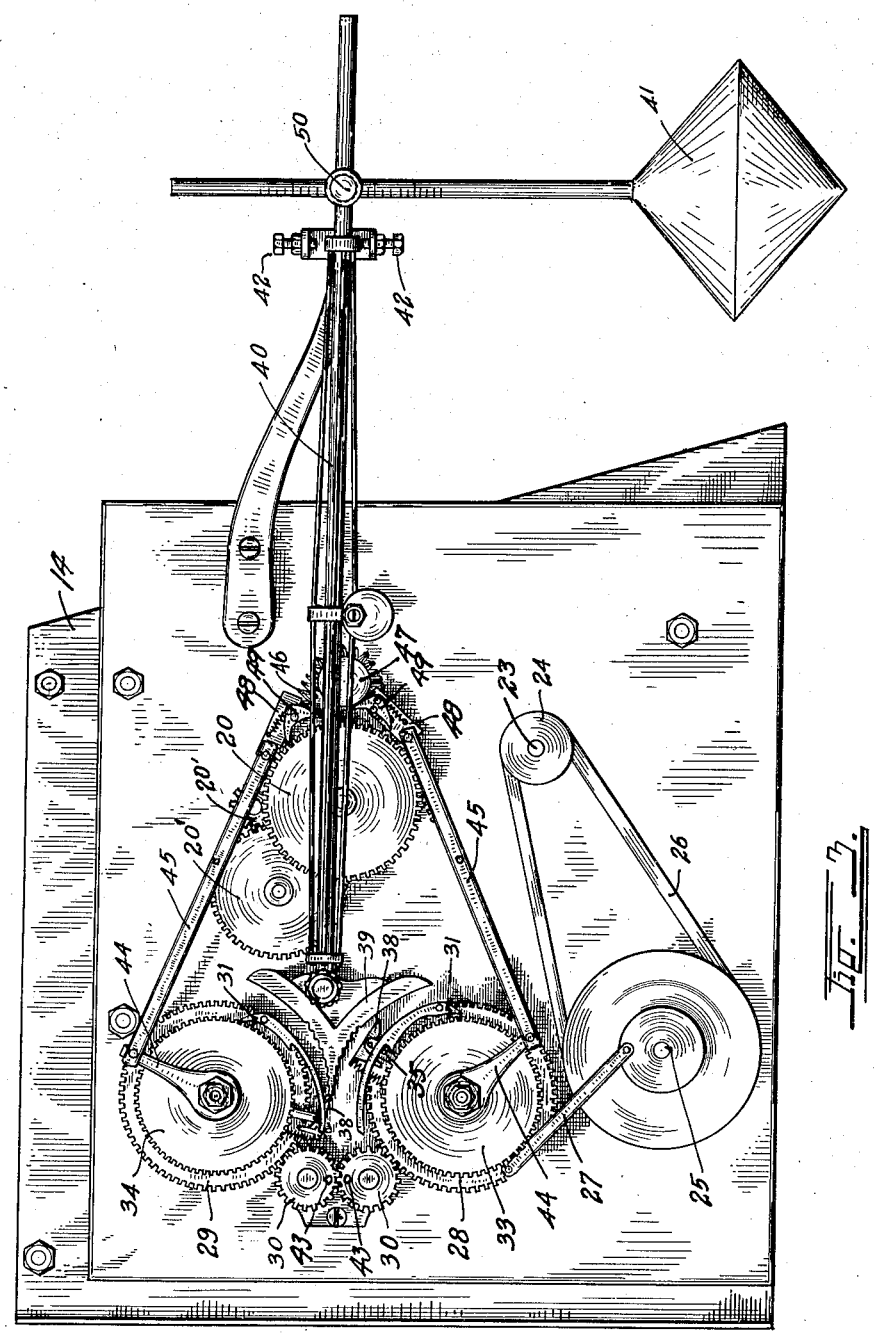

Aug. 22, 1939.  D. W. KARNES  2,170,200
HEAD GATE CONTROL DEVICE
Filed Sept. 6, 1938   6 Sheets-Sheet 4
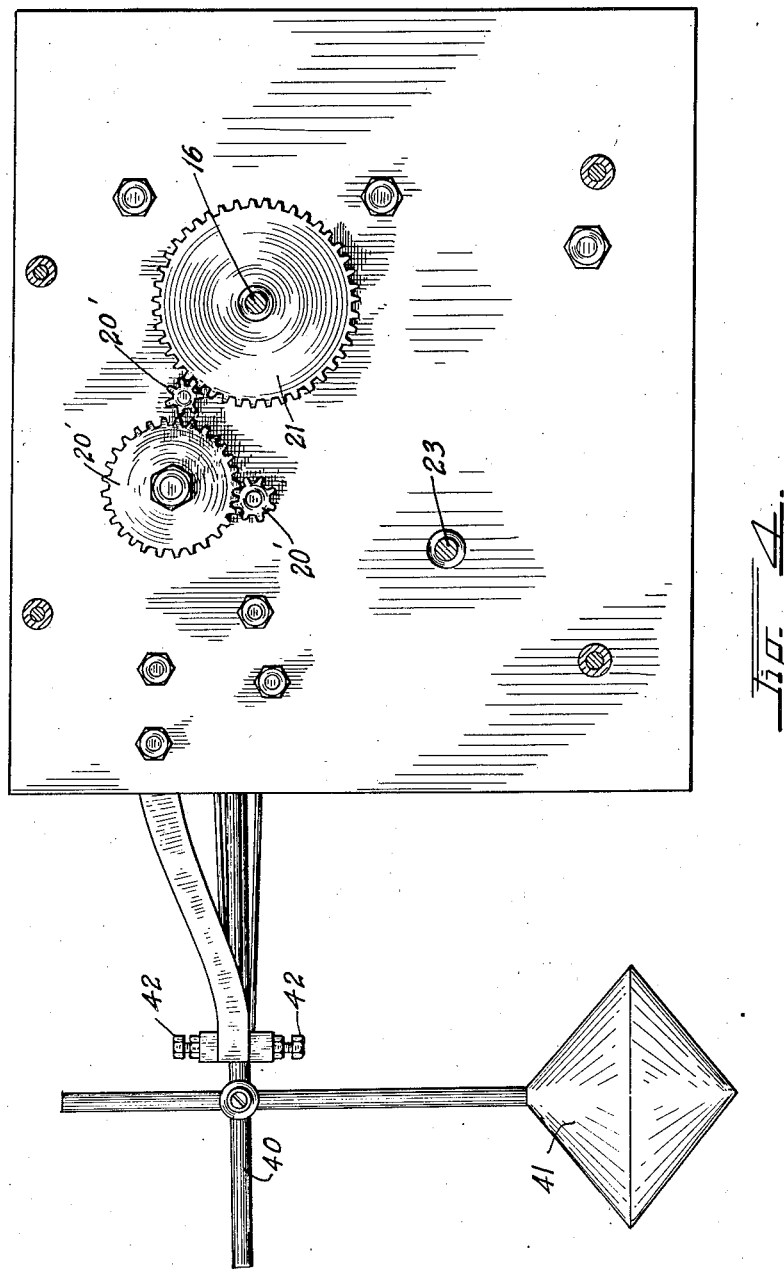
INVENTOR.
D. W. KARNES.
BY
ATTORNEY.

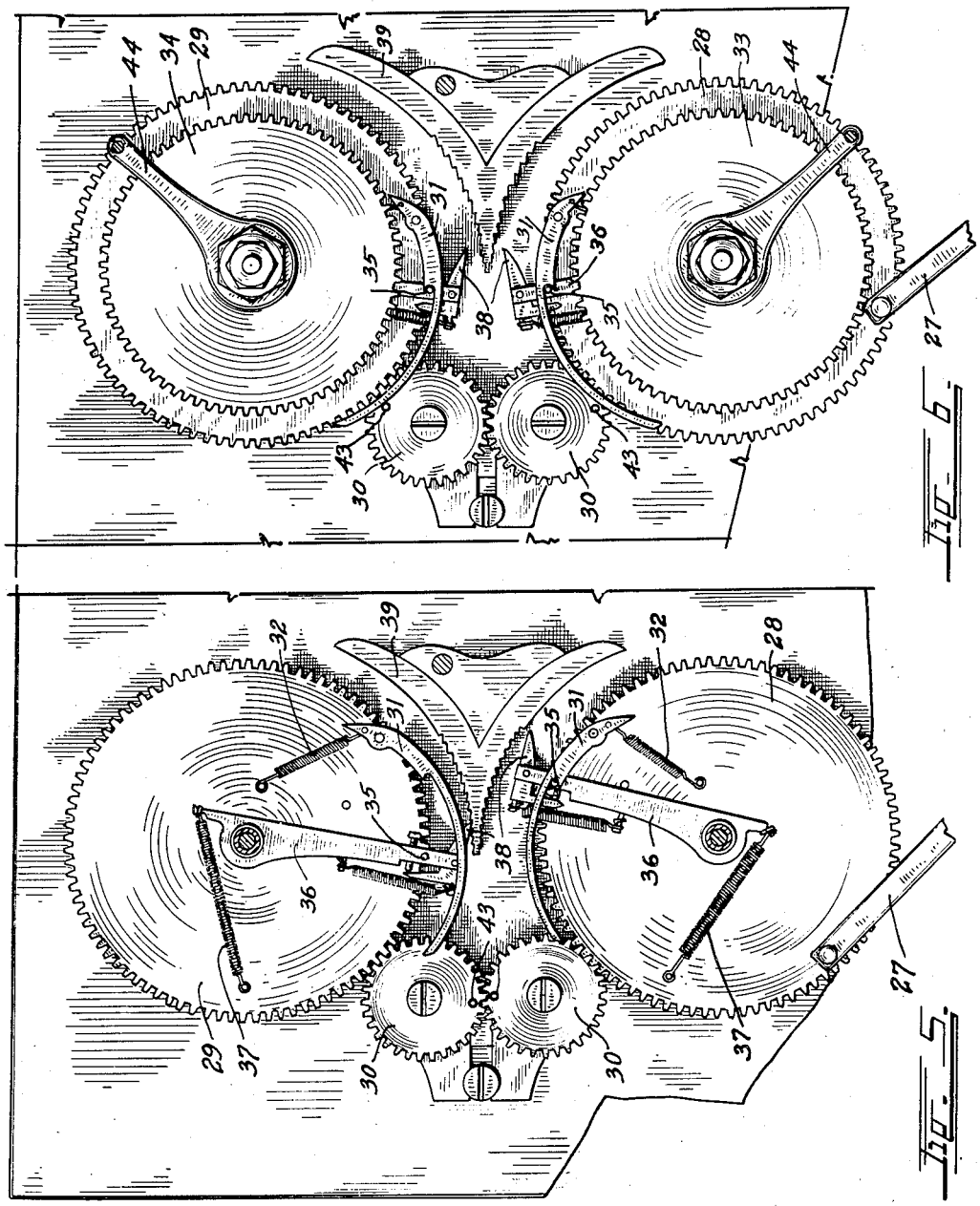

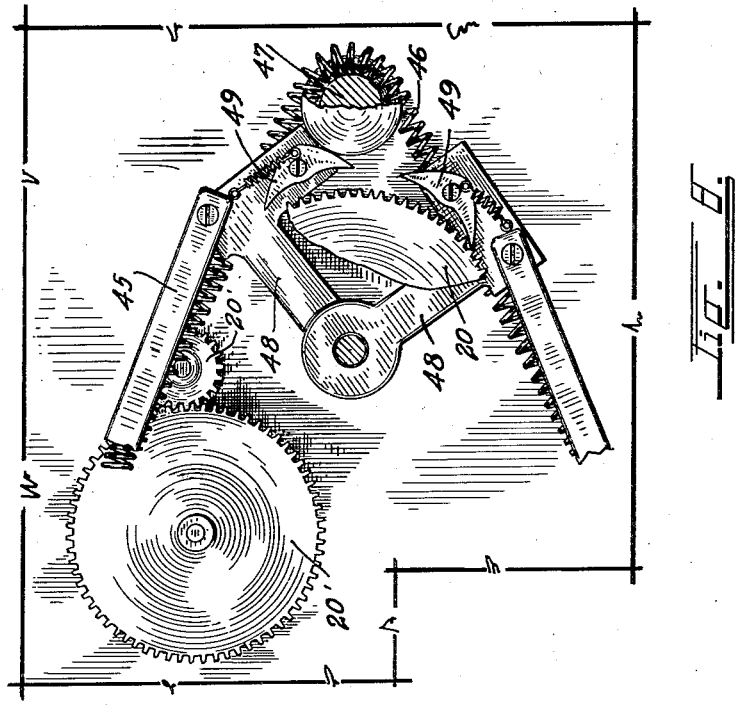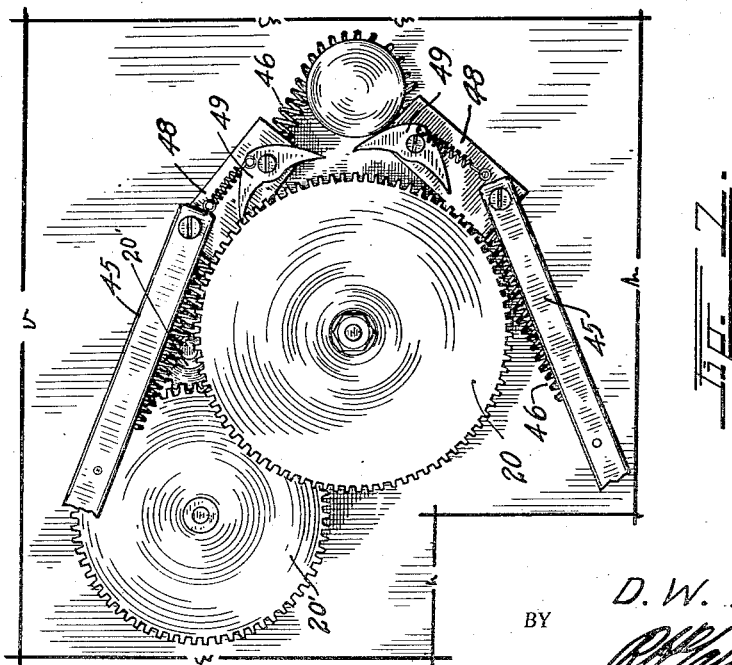

Patented Aug. 22, 1939

2,170,200

UNITED STATES PATENT OFFICE 2,170,200

HEAD GATE CONTROL DEVICE

David W. Karnes, Denver, Colo.

Application September 6, 1938, Serial No. 228,468

14 Claims. (Cl. 61—23)

This invention is a head gate control, more particularly for controlling the amount of water flowing from a reservoir or feed ditch into a lateral or supply ditch, which will be found useful wherever it is desired to maintain an absolutely uniform flow of water regardless of variations in the head or pressure in the supply reservoir.

Manually controlled head gates at a reservoir or other source of supply can be opened to admit a desired flow of water into a ditch or conduit but the flow therethrough will increase as the head rises in the reservoir or will decrease as the head falls therein if the opening at the gate remains unchanged.

The principal object of this invention is to provide means which will automatically adjust the opening of the gate when any variations in the pre-set flow therethrough occur so as to maintain an absolutely uniform rate of flow at all times regardless of varying head conditions.

Another object of the invention is to so construct the device that it will not require outside power for operation but will employ the power of the water flowing through the gate for its operation.

Other objects and advantages reside in the detail construction of the invention, which is designed for simplicity, economy, and efficiency. These will become more apparent from the following description.

In the following detailed description of the invention reference is had to the accompanying drawings which forms a part hereof. Like numerals refer to like parts in all views of the drawings and throughout the description.

In the drawings:

Fig. 1 is a longitudinal section through the flow channel of the improved head gate control device.

Fig. 2 is a plan view thereof.

Fig. 3 is an outside face view of the mechanism plate of the device.

Fig. 4 is an inside face view of the mechanism plate, taken on the line 4—4, Fig. 2.

Figs. 5 and 6 are detail views illustrating various portions of the operating mechanism.

Figs. 7 and 8 illustrate various positions of the gate operating ratchets.

In the drawings the wall of a reservoir is indicated at 10 having an outlet opening 11 through which the flow of water is to be controlled by this invention. The ditch to which the water is fed is indicated at 12. In the ditch 12, or at one side thereof, is a float chamber 13. The level of the water in the float chamber corresponds, of course, to the level of the water in the ditch.

The water in flowing from the outlet 11 to the ditch 12 is confined between two side plates 14 and the flow is controlled by means of a pivoted cylinder gate 15 mounted on a gate shaft 16. Leakage upwardly past the gate is prevented by means of a gasket 17 and, when the gate is closed, leakage beneath the gate is prevented by means of a bottom gasket 18. Other types of gate construction may be used if desired.

A counter-weight 19 is mounted on the opposite side of the gate shaft to balance the weight of the gate so that the shaft may be rotated with little effort.

The gate is raised or lowered by means of a gate control gear 20, the movements of which are conveyed by means of a train of reduction gears 20' to a gate actuating gear 21.

The power for operating the various gear trains is obtained from a water wheel 22 mounted on a wheel shaft 23 between the side plates 14. The wheel 22 rotates constantly as long as any water is flowing through the gate 15. The wheel shaft 23 carries a gear or pulley 24 which drives a crank shaft 25 through the medium of a belt 26 or in any other desired manner.

The crank shaft 25 transmits reciprocatory power through a connecting rod 27 to a pair of oscillating gears 28 and 29. The gears 28 and 29 move in unison but in opposite directions due to the fact that they are connected through the medium of a pair of reversing pinions 30.

On each of the gears 28 and 29 a long, curved ratchet pawl 31 is pivoted. The pawls 31 are constantly urged, by means of springs 32, toward the teeth of a pair of ratchet gears 33 and 34. The ratchet gears 33 and 34 are loosely mounted on the shafts of the gears 28 and 29, respectively.

The ratchet pawls 31 are normally held out of engagement with the teeth of the ratchet gears 33 and 34 by means of locking pins 35 which engage in notches in the pawls. These pins project from ratchet rocking arms 36, there being one of these arms on each gear shaft between the oscillating gears and the ratchet gears.

Springs 37 constantly act upon the arms to hold the locking pins in the pawl notches and to cause the arms 36 to follow the oscillating movement of the gears 28, 29, 33, and 34. The rocking arms 36 are stopped at predetermined times by means of spring actuated fingers 38 which come into contact with teeth formed on the opposite sides of a spear head member 39. When either of the arms 36 is stopped, its ratchet pawl 31 will move away from its locking pin 35 to allow the spring 32 to pull the pawl into contact with the teeth of its ratchet gear 28 or 29 so that the latter gear will be moved in unison with its oscillating gear 33 or 34.

The spear head member is carried on the extremity of a rocking beam 40, the other extremity of which, supports a float 41 within the float chamber 13. The arc of movement of the rocking beam is adjustably limited by means of suitable set screws 42.

Normally the spear head is in the position of Fig. 6 but should the water level lower in the float chamber fall, the spear head member will rise to the position of Fig. 5 where it will be engaged by the finger 38 of the upper arm 36 as the latter reciprocates. This will allow the pawl 31 to move away from the locking pin 35 to release the pawl so that it may engage the teeth of the gear 34 to rotate it to the left. Should the water in the float chamber rise, the spear head 39 will move downward to release the lower ratchet 31 to cause it to move the lower gear 33 to the right. The gears 28 and 29 oscillate constantly as long as the water wheel operates.

Each of the reversing gears 30 carries a projecting releasing pin 43. These pins move into contact with the rear extremities of the pawls 31 at each return oscillation of the gears, as shown in Fig. 6, to release the pawl from the ratchet teeth and so that they will again receive their locking pins 35 and be locked out of engagement with the ratchet gears 33 and 34.

Therefor, as long as the spear head 39 remains in the position of Fig. 5, the upper pawl 31 will be released on each counterclockwise movement to engage the gear 34 and on each clockwise movement will be returned to its former position and locked by the pin 35, due to its contact with the pin 43. Thus, as the spear head member moves upward, the gear 34 is rotated to the left intermittently and as the spear head member lowers, the gear 33 is intermittently rotated to the right.

The gears 33 and 34 each carry a crank arm 44 and from each of the crank arms 44, a draw bar 45 extends. The two draw bars are constantly pulled to the right and toward each other by means of a tension spring 46 which is secured to the draw bars at its extremities and extends about a spring stud 47. The spring 46 also acts to return the ratchet gears to their "at rest" position as soon as they are released by the pawls 31. The extremities of the draw bars are each connected to an independent rocker 48. The rockers 48 are pivotally mounted on the shaft of the gate control gear 20. The rockers 48 carry ratchet pawls 49 which at their one extremity engage the teeth of the gate control gear 20, if either rocker is drawn upon, and at their other extremities engage the spring stud 47 to release them from the teeth of the gear as the rockers return. Therefor, when the gear 33 is rotated by its pawl in a clockwise direction and when the gear 34 is rotated in a counterclockwise direction, its draw bar will pull the gate control gear 20 in a counterclockwise direction. Clockwise movement of the gear 20 closes the gate and counterclockwise movement thereof opens the gate.

Therefor, the opening and closing of the gate is controlled by the position of the spear head member 39 and the position of the spear head member is controlled by the position of the float 41, which, of course, depends upon the level of the water in the float chamber 13. Should this level fall, the gate will gradually open in intermittent intervals, should this level rise, the gate will gradually close until the preset level in the float chamber is again reached. The height of the float is adjustable on the beam 40 through the medium of a set screw 50 to correspond with the desired height of the water in the chamber 13. Should more water be desired, the float is raised on the beam 40 and should less water be desired, the float is lowered.

The gears 28, 29, 33 and 34 never completely rotate. Their arc of movement is determined by the throw of the connecting rod 27. Therefor the entire circumference of these gears is not used and they could, if desired, be simple sector arms. It has been found advisable, however, to form them as complete gears, as shown so that when they become worn at the most used portions, they may be renewed by simply releasing them and rotating them to an unused portion.

While the invention has been described as particularly valuable for controlling the amount of water flowing through a headgate, it is, of course, not limited to this particular use but will be found valuable in any installation where it is devised to automatically maintain a uniform flow of fluid through a conduit.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A device for automatically opening and closing a headgate in consequence of variations of the height of a float so as to maintain a uniform flow of fluid through a conduit, comprising: a pair of rotary oscillating members; a ratchet wheel for each of said members; a ratchet pawl oscillated about each ratchet wheel by one of said members, said pawls moving in unison and in opposite directions; means operable from said float for causing either one of said pawls to engage its ratchet wheel; and means for transmitting the movement of said ratchet wheels to said gate to open or close the latter.

2. A device for automatically opening and closing a headgate in consequence of variations in the height of a float so as to maintain a uniform flow of fluid through a conduit, comprising: a pair of rotary members oscillating in opposite directions; and means controllable by said float for transmitting the movement or either one of said rotary members to said gate to open or close the latter.

3. A device for automatically opening and closing a headgate in consequence of variations in the height of a float so as to maintain a uniform flow of fluid through a conduit, comprising: a pair of rotary members oscillating in opposite directions; a ratchet pawl attached to each of said members; a ratchet wheel mounted at the axis of each ratchet pawl; means controlable by said float for placing either one of said ratchet pawls into contact with its ratchet wheel; and means for transmitting the movement of said ratchet wheels to said gate to open or close the latter.

4. A device for automatically opening and closing a headgate in consequence of variations in the height of a float so as to maintain a uniform flow of fluid through a conduit, comprising: a pair of rotary members oscillating in opposite directions; a ratchet pawl attached to each of said members; a ratchet wheel mounted at the axis of each ratchet pawl; means controlable by said float for placing either one of said ratchet pawls into contact with its ratchet wheel; a wheel for opening and closing said gate; and a second pair of ratchet members operated from said ratchet wheels to actuate said latter wheel.

5. Means for automatically opening and closing a headgate in consequence of variations in the height of a float comprising: a rocking arm supported at one extremity by said float; a pair of oppositely oscillating members positioned on opposite sides of the opposite extremity of said rocking arm; and means on said latter extremity for causing said headgate to move in consequence of the movement of either one of said oscillating members.

6. Means for automatically opening and closing a headgate in consequence of variations in the height of a float comprising: a rocking arm supported at one extremity by said float; a pair of oppositely oscillating members positioned on opposite sides of the opposite extremity of said rocking arm; a ratchet wheel concentrically mounted with each oscillating member; a spring-actuated ratchet pawl carried by each oscillating member at the periphery of its ratchet wheel; means operable by the other extremity of said rocking beam for placing either one of said pawls into contact with its ratchet wheel; and means for transmitting the movements of said ratchet wheels to said gate to open or close the latter.

7. Means for automatically opening and closing a headgate in consequence of variations in the height of a float comprising: a rocking arm supported at one extremity by said float; a pair of oppositely oscillating members positioned on opposite sides of the opposite extremity of said rocking arm; a ratchet wheel concentrically mounted with each oscillating member; a spring-actuated ratchet pawl carried by each oscillating member at the periphery of its ratchet wheel; a locking member in the path of movement of each ratchet pawl normally holding it out of contact with its ratchet wheel; means on the other extremity of said rocking arm for engaging and releasing either one of said locking means; and means for transmitting the movements of said ratchet wheels to said gate to open or close the latter.

8. Means for automatically opening and closing a headgate in consequence of variations in the height of a float comprising: a rocking arm supported at one extremity by said float; a toothed spear head member formed on the other end of said rocking arm; a pair of oscillating members positioned on opposite sides of said spear head member; a ratchet wheel concentrically mounted with each oscillating member; a spring-actuated ratchet pawl carried by each oscillating member at the periphery of its ratchet wheel; a ratchet rocking arm mounted between each oscillating member and ratchet wheel; a locking member carried by said ratchet rocking arm and positioned in the path of movement of each ratchet pawl normally holding it out of contact with its ratchet wheel; a finger carried by each ratchet rocking arm to release either one of said locking means by engaging said spear head member; a crank arm carried by each of said ratchet wheels; a draw bar extending from each of said crank arms; a toothed gate control gear; a pair of rockers mounted adjacent the said gate control gear, each draw bar being connected at its other end to one of said rockers; a ratchet pawl carried by each rocker engaging the teeth in said gate control gear; and means for conveying movement of said gate control gear to said head gate to open or close the latter.

9. Means for automatically opening and closing a headgate in consequence of variations in the height of a float comprising: a water wheel; a crank shaft driven by said water wheel; an oscillating gear; a connecting rod connecting said crank shaft and said oscillating gear to transmit reciprocating power to the latter; a pair of reversing pinions in mesh with each other, one of said pinions being in mesh with said oscillating gear; a second oscillating gear in mesh with the other pinion; a ratchet wheel concentrically mounted with each oscillating member; a spring-actuated pawl carried by each oscillating member at the periphery of its ratchet wheel; a locking member in the path of movement of each ratchet pawl normally holding it out of contact with its ratchet wheel; means controllable by said float for placing either one of said ratchet pawls into contact with its ratchet wheel; means projecting from each pinion to release said ratchet pawls from contact with the ratchet wheels on every revolution of said pinions; a gate wheel for opening and closing said gates; and means for transmitting the movements of said ratchet wheels to said gate wheel.

10. Means for automatically opening and closing a headgate in consequence of variations in the height of a float comprising: a rocking arm supported at one extremity by said float; a pair of oppositely oscillating members positioned on opposite sides of the other extremity of said rocking arm; a ratchet wheel concentrically mounted with each oscillating member; a ratchet pawl carried by each oscillating member at the periphery of its ratchet wheel; a pair of rockers; a gate control wheel for opening and closing said gate; a second pair of ratchet pawls carried by said rockers in mesh with the gate control wheel; and means for transmitting movement of said ratchet wheels to said gate control wheel.

11. Means for automatically opening and closing a headgate in consequence of variations in the height of a float comprising: a rocking arm supported at one extremity by said float; a pair of oppositely oscillating members positioned on opposite sides of the other extremity of said rocking arm; a ratchet wheel concentrically mounted with each oscillating member; a ratchet pawl carried by each oscillating member at the periphery of its ratchet wheel; a ratchet rocking arm mounted between each ratchet wheel and oscillating member; a locking member carried by each ratchet rocking arm and positioned in the path of movement of said ratchet pawl normally holding it out of contact with its ratchet wheel; a finger carried by each of said ratchet rocking arms; a toothed spear head member formed on the free extremity of said rocking arm to engage either of said fingers on said ratchet rocking arms to release either of said ratchet pawls; and means for transmitting movements of said ratchet wheels to said gate to open or close the latter.

12. Means for automatically opening and closing a headgate in consequence of variations in the height of a float comprising: a rocking arm supported at one extremity by said float; a pair of oppositely oscillating members positioned on opposite sides of the other extremity of said rocking arm; a ratchet wheel concentrically mounted with each oscillating member; a ratchet pawl carried by each oscillating member at the periphery of its ratchet wheel; means operable by the other extremity of said rocking arm for placing either one of said pawls into contact with its ratchet wheel; means for releasing said ratchet pawls from contact with its ratchet wheels at every return oscillation of said oscillating members; and means for transmitting the movements of said ratchet wheels to said gate to open or close the latter.

13. A means for automatically opening and closing a headgate in consequence of variations of the height of a float comprising: a pair of rotary members oscillating in opposite directions; a ratchet pawl attached to each of said members; a ratchet wheel mounted at the axis of each ratchet pawl; means operable from said float for placing either one of said ratchet pawls into contact with its ratchet wheel; a gate control wheel; means for transmitting the movement of said ratchet wheels to said gate control wheel; and means for transmitting movement of said gate control wheel to said gate to open or close the latter.

14. A means for automatically opening and closing a headgate in consequence of variations of the height of a float comprising: a pair of rotary members oscillating in opposite directions; a ratchet pawl attached to each of said members; a ratchet wheel mounted at the axis of each ratchet pawl; means operable from said float for placing either one of said ratchet pawls into contact with its ratchet wheel; a gate control wheel; a pair of rockers; a ratchet pawl carried by each of said rockers in mesh with said gate control wheel; a draw bar connecting one of said ratchet wheels with one of said rockers; and a second draw bar connecting the other ratchet wheel with the other rocker.

DAVID W. KARNES.